United States Patent Office 3,491,952
Patented Jan. 27, 1970

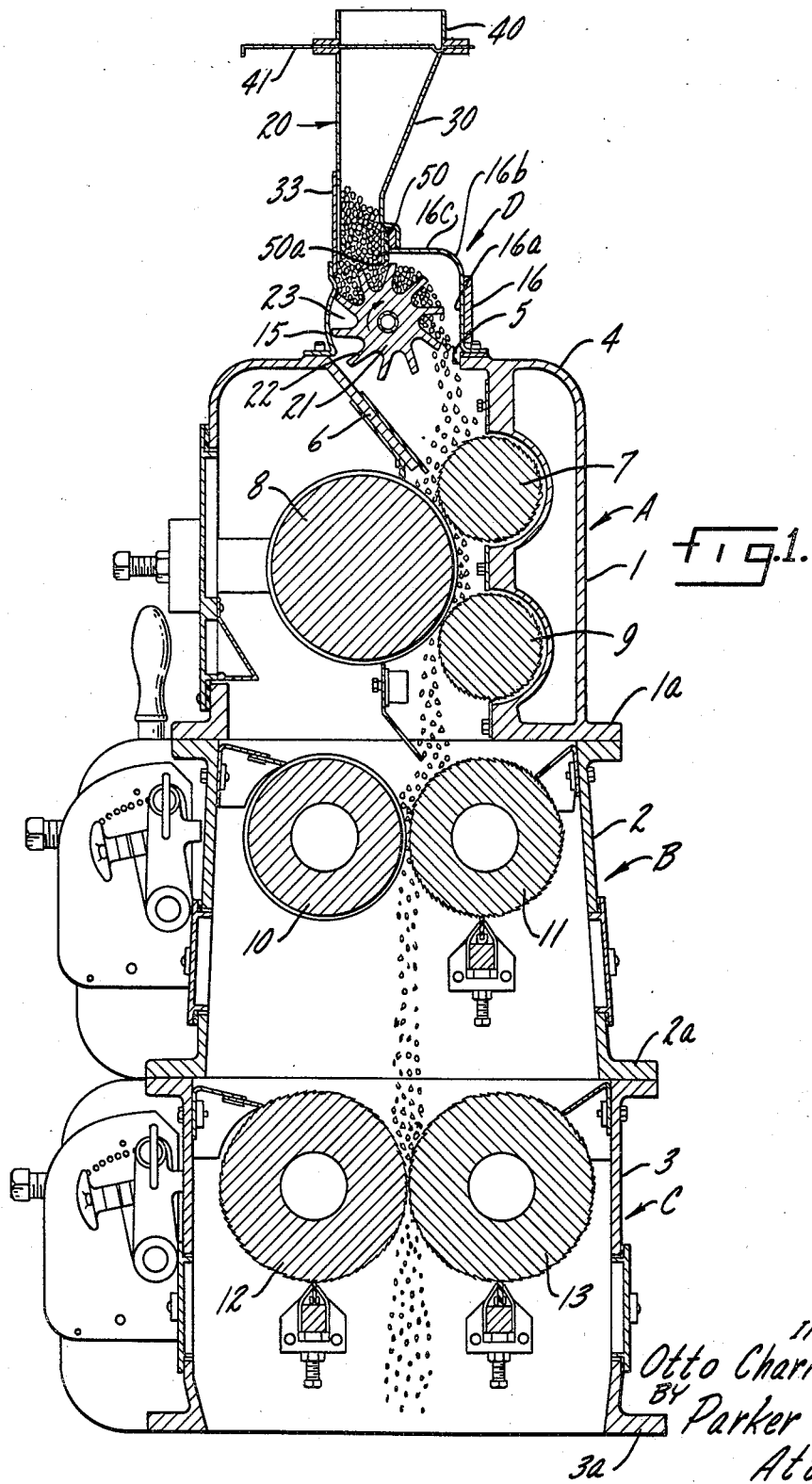

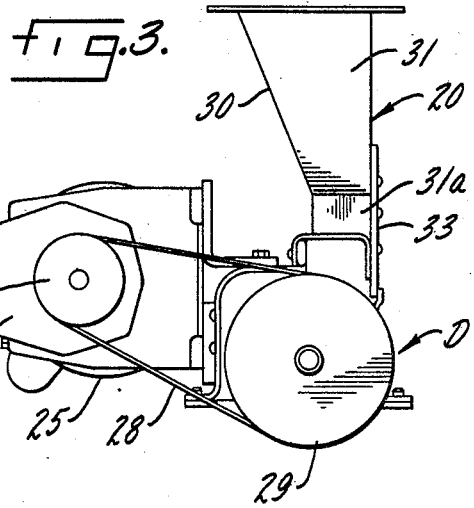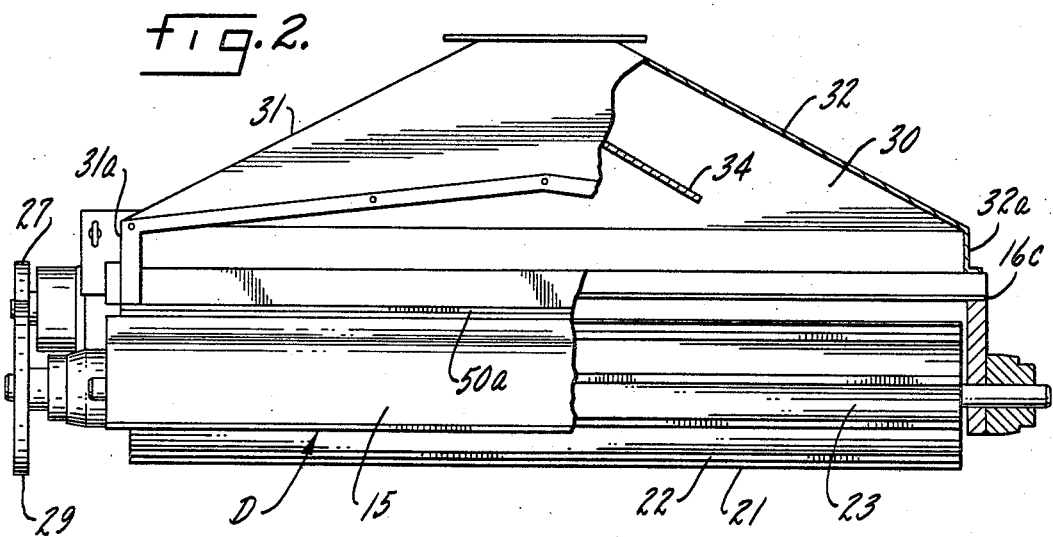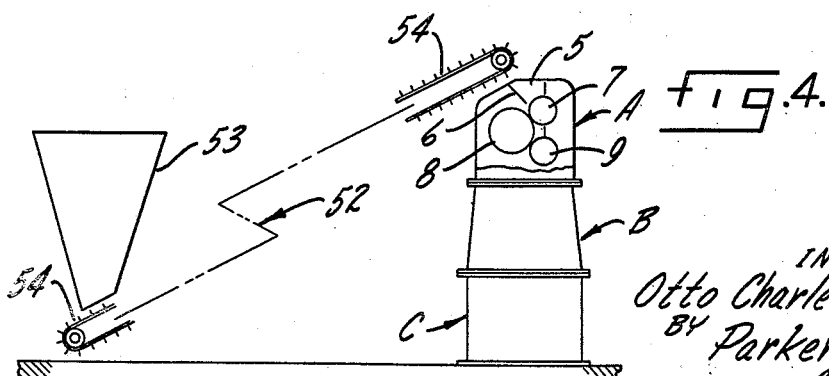

3,491,952
GRANULIZER WITH POWER FEEDER
Otto Charles Krolopp, Villa Park, Ill., assignor to Blaw-Knox Company, Pittsburgh, Pa., a corporation of Delaware
Filed Sept. 15, 1966, Ser. No. 579,634
Int. Cl. B02b 5/02; B02c 7/18, 9/00
U.S. Cl. 241—13                    2 Claims

ABSTRACT OF THE DISCLOSURE

A feeding means for coffee granulizers and the like, to distribute coffee beans to the granulizer rolls uniformly from end to end of the rolls, the feeding means being constituted by a separate power unit which operates a longitudinally fluted feed member.

---

The invention relates to an improvement in feeding means for coffee granulizers and the like. One purpose is to provide improved means for distributing coffee beans to the granulizer rolls uniformly from end to end of the rolls.

Another purpose is to provide improved power feed means wherein a power-driven feed rotor supports the load of coffee beans above it, and delivers beans downwardly to the granulizer rolls under conditions which prevent any pressure of the bean supply upon the rolls themselves, or upon the beans actually entering the bite of the first pair of rolls.

Another purpose is to provide a method of feeding coffee beans evenly to the rolls of a coffee granulizer, whereby to improve capacity and output and to reduce wear on the rolls.

Another purpose is to provide an improved means and method for preventing pressure from above upon the mass of coffee beans entering the top inlet opening of a coffee granulizer.

Other purposes will appear from time to time in the course of the specifications and claims.

Coffee granulizers are well-known in the art and may, for example, include a housing with a top inlet for coffee beans and a plurality of sets of granulizer rolls within the housing, coffee beans being fed downwardly into the top of the granulizer housing to be directed to and through the granulizer rolls.

It has, in the past, been customary to deliver coffee beans to the upper rolls of a granulizer at spaced intervals, natural dispersion being relied upon to spread the coffee beans over the full length of the rolls. As an example, on a standard gravity feed, coffee beans have been fed to upper rolls at four places in a granulizer, the rolls of which are thirty inches in length, and at three places on a granulizer having rolls eighteen inches in length. These are merely examples of past practice well-known to applicant. In practice natural dispersion has not worked out. While the coffee beans do spread, the points directly below the feed openings receive the greatest amount of feeding pressure, and, consequently, do the greatest amount of grinding. The coffee beans spread are, in practice, subject to the constant pressure of a mass of coffee beans above the granulizer, a mass which may extend clear to a feed or supply hopper spaced well above the granulizer housing. That this localized feed, in connection with static pressure, is not effective can be proved by inspection of worn rolls. A worn roll has badly worn corrugations directly under the feed openings or feed points, while the corrugations between openings are worn to a much lesser degree. These intermediate, less worn areas would normally be capable of considerable further use, were it not for the excessive wear at the areas of delivery and of maximum grinding. This localized wear prevents the continued use of the worn rolls, and the rolls must be resharpened or replaced. I find that with the power feeder of the present application a measured amount of coffee beans is laid over the full length of the rolls, no coffee being forced between the rolls at any point. Stated otherwise, the mass of coffee beans delivered to the rolls is uniformly concentrated throughout the length of the rolls. The apparatus and method of the present application not only allows uniform wear of the rolls but also removes any head pressures or static pressures from affecting the surface of the rolls, and insures maintenance of grind quality at all feed rates.

The use of the power feeder or method of the present application presents possibilities of automation, because of its ability to maintain grind quality independent of grind or capacity. For example, with the use of my apparatus and method it is possible to employ automatic controls for the feeder which will adjusted the feed rate to the granulizer in response to power usage. In this way the granulizer may be employed automatically to adjust its feed rate to a desired maximum, regardless of grind, blend, or degree of roast of the coffee beans.

In the practice of my invention I employ a power feed roll which receives the head of coffee beans from whatever supply source, supply hopper, or feed duct is employed. To the extent that a static head of pressure exists, this head or load is received upon a fluted feed roll and the feed roll or rotor is power driven at controlled speed. As it rotates it removes units of coffee beans from the bottom of the mass above it, conveys them laterally and downwardly, and drops them freely by gravity, and without static head of pressure, upon the top roll of the granulizer, or upon any suitable means for directing the beans to the bite between the top pair of rolls.

I illustrate my invention more or less diagrammatically in the accompanying drawings, wherein:

FIGURE 1 is a vertical section through a granulizer to which my power feed assembly has been applied, the section being taken at right angles to the axes of the granulizer rolls;

FIGURE 2 is a side elevation of the power feed assembly shown at the top of FIGURE 1, on an enlarged scale, and with parts broken away and parts in section;

FIGURE 3 is an end elevation as viewed from the left of FIGURE 2 of the power feed assembly and the power source employed to drive it; and FIGURE 4 is a diagrammatic view of an alternative embodiment of my invention.

Like parts are indicated by like symbols throughout the specification and drawings.

Since the granulizer is not of itself part of the present invention I will describe it somewhat summarily. The particular granulizer herein shown includes sections A, B and C, there being mounted in each section at least a pair of granulizer rolls. Each section includes side walls 1, 2 and 3, respectively, and flanges 1a, 2a and 3a, respectively, which may be employed for connecting the sections or for supporting the bottom section C upon any suitable base or support. The top section A is shown as having a top wall 4, the shape of which is not critical, but which is shown as including a top opening 5 and a downwardly inclined deflector flange or wall portion 6 which is directed generally toward the upper roll 7 or toward the bite between the upper roll 7 and an opposed roll 8. A lower roll 9 is also indicated as opposed to the roll 8. It will be understood that the details of the rolls are unimportant so far as relates to the present invention. However, in FIGURE 1, I illustrate, in the lower sections B and C, additional pairs of opposed rolls 10, 11 and 12, 13, respectively. The present invention and application relate not to the arrangement of rolls in the granulizer but to the method and apparatus for feeding coffee beans to the top pair of rolls 7 and 8, in such fashion as to provide a uniform distribution of the coffee beans throughout the entire length of the bite between the two rolls.

Specifically, above the opening 5 I illustrate a feed housing, generally indicated as D, which may vary widely in detail, but is shown as having an arcuate wall 15 at one side of the opening 5 and a wall 16 at the opposite side, which is shown as including an upright component 16a and a horizontal component 16c connected by an arcuate portion 16b. It will be observed that a laterally expanded or flared delivery structure, generally indicated as 20, extends downwardly into contact with the walls 15 and 16c, and is so positioned as to feed coffee beans downwardly into the space within the feed housing D, at the left side of the structure, as shown in FIGURE 1.

Rotatably mounted within the feed housing is a feed roll or rotor 21, shown as fluted or provided with end-to-end pockets, generally parallel with each other and with the axis of the rotor. In the particular structure herein shown I may employ a unitary rotor, for example, of cast iron, which is formed to include a plurality of vanes 22 which define, between them, pockets 23. It will be understood, in the particular structure shown in FIGURE 1, that the rotor 21 is rotated clockwise. Any suitable bearing arrangements, not herein shown in detail, may be employed, but, as will be clear from FIGURE 3, a suitable motor is provided, shown at 25, which may have associated with it a variable speed gear head drive 26. The variable speed drive is effective to rotate the sprocket 27 at a range of desired speeds, and it, through a chain or suitable driving connection 28, drives the sprocket 29, which may be mounted coaxially with the rotor 21, or otherwise suitably connected to it, so that, through the motor, variable speed drive, and chain and sprockets, the rotor 21 is rotated at a range of selected speeds. In the particular structure herein shown the vanes 22 of the rotor are shown as projecting slightly forwardly in the direction of rotation of the rotor. It will be understood that any suitable means may be employed to deliver beans downwardly through the downwardly and outwardly flared chamber or delivery housing 20. In the showing of FIGURE 1, the mass of beans so fed will rest on the left side of the rotor 21. When the rotor is at rest it constitutes a stoppage or closure, and prevents any significant flow of coffee beans downwardly through the delivery structure or chamber 20. In the particular form herein shown the chamber 20 is shown as having an inclined side wall 30, apparent in FIGURES 1 and 3, and diverging inclined top walls 31, 32, as shown in FIGURE 2. These walls terminate in vertical end portions 31a and 32a. A removable panel 33 may be provided, if desired, for access to the interior of the structure thus formed. Within the chamber 20 I provide a plurality of inlet deflectors 34, which assist in distributing the beans along the full length of the bottom of the structure or chamber as it joins the feed housing D. It will be understood that the upper end of the chamber 20 may be secured to any suitable upper passage or downspout 40, as shown in FIGURE 1, through which coffee beans may pass from any suitable supply or storage means, not shown. If desired, an apertured shut-off gate 41 may be provided.

Within the housing D I illustrate a strip of rubber or the like, generally shown at 50, which includes a loose, lower edge 50a which enters the compartment D and terminates generally at the radius of the vanes 22 of the rotor 21. It will be understood that in ordinary use a substantially continuous mass of beans is present within the upper chamber 20 of FIGURES 1 and 2, covering the rotor 21 from end to end. These coffee beans thus fill the pockets or flutes 23 from end to end. The volume of beans in each pocket tends to be evened up as the rotor vanes rotate past the lower edge 50a of the flexible flap 50. This tends to acts as a skimmer or evener, in such fashion that as the pockets pass below it they are uniformly and evenly filled from end to end.

It will be observed, as in FIGURE 1, that whereas the wall 15 conforms substantially to the path of the outer edges of the vanes 22, the wall portions 16a, 16b, 16c are spaced outwardly of the path of the vane edges. I find it advantageous to provide some clearance or space at this point. However, under normal conditions, this chamber will not be filled with beans, and the beans which pass through it will be limited substantially to the masses or charges of beans picked up by each successive pocket 23 that passes beneath the lower edge 50a of the flap 50. As the rotor 21 rotates in a clockwise direction, these successive masses or charges of beans are moved laterally from the lower portion of the mass indicated in the chamber D, and are thereafter carried downwardly, by the rotation of the rotor, and are dropped into the space between the deflector 6 and the roll 7. Some may strike the deflector 6 and slide down it into the bite between the rolls 7 and 8. In practice, in the structure as shown, most of the beans will land on the surface of the roll 7 and will be carried, by its counter-clockwise rotation, into contact with the roll 8, and thus into the bite between the two rolls. The length of the rotor 21 is substantially the same as the length of the rolls 7 and 8, and the deflector 6. Thus there is an equal distribution of the beans along the length of the roll 7 and along the bite between 7 and 8, and thus both feed and consequent wear will be completely equalized from end to end of the rolls. It will also be understood that the same condition will prevail throughout the sequence of granulized rolls, since each set of rolls treats or grinds the same uniform distribution of coffee particles. There is thus no tendency for any inequality of feed or any inequality of roll wear through the granulizer system.

In the embodiment shown in FIGURE 4 a conveyor has been employed in lieu of the vaned rotor 21 of the FIGURE 1 embodiment. Conveyor 52 receives beans or other material to be treated from a source of supply, such as hopper 53, and conveys the material upwardly to a discharge point above deflector 6. The conveyor includes a plurality of elongated pockets 54 which are so arranged as to preclude spillage of material between adjacent pockets during the upward movement of the filled pockets or receptacles to the discharge point. A slat conveyor may be employed if desired, the individual pockets being formed by U-shaped members or even angle irons. In any event a common carrier serially moves material receiving pockets from a filling position to a discharging position at which they are successively discharged by inversion of the pockets as they pass around the head end of the conveyor.

It will be realized that whereas I have described and shown a practical and operative device, and a device adapted to carry out my method, nevertheless many changes may be made in size, shape, number and disposition of parts without departing from the spirit of my invention. I therefore wish my drawings to be taken as in a broad sense illustrative or diagrammatic, rather than as limiting me to my specific showing herein. In particular, whereas the specific power feeder herein shown is effective and efficient, it will be understood that changes may be made in the size and shape and material of the rotor, and in the distribution and contour of its flutes or pockets. What I do consider essential is that the pressure of beans above the rotor 21 is supported by the rotor and is prevented from affecting in any way the action or movement of the beans as they flow to and through the granulizer rolls.

The use and operation of the invention are as follows:

As I have mentioned, I find from experience that any localized feed of coffee beans to the rolls of a granulizer produces inequalities in output and inequalities in wear. I therefore find it important to provide a structure and a method in which the pressure or head of coffee beans is completely isolated from the delivery zone in such fashion as to have no effect whatsoever upon the movement of the beans at their entry into the granulizer or between the top granulizer rolls. At the same time, I find it highly important to insure that the beans are delivered to the granulizer, and, specifically, to the bite between the top granulizer rolls or to the top granulizer roll with a uniform distribution of beans from end to end of the rolls. The particular mechanism I illustrate for obtaining this result is the vaned or fluted feed roll 21 which, when at rest, serves as a positive stop for the beans being fed downwardly toward the granulizer. When the rotor is in movement it permits or causes the removal from the bottom of the substantially statically supported mass of beans a sequence of charges which are dropped in rapid succession into the granulizer. In effect, they form a substantially continuous mass of freely falling beans, which do not have a damaging head or pressure and which are sparsely and controllably fed by variations in the rate of rotation of the rotor 21. This is in contrast to the prior art practice of delivering the beans directly against the granulizer top roll, with a full head of pressure, and localized, concentrated delivery areas.

In my structure, and by my method, there is never a time when there is any damaging head or pressure of beans effective against the inlet of the granulizer or against the increments of bean being gripped between the initial pair of granulizer rolls. The sparsely fed beans are uniformly distributed from end to end of the granulizer rolls, with no damaging localization of delivery and consequent localization of wear. In use, the power feeders made to practice my invention, and applied to Gump granulizers, have given startlingly good results. In each installation the power feed unit has provided an increase in granulizer capacity without an increase in maximum power consumption, and with no deterioration of grind quality. Experience indicates that the percentage of increase is greatest on fine grinds, where granulizer capacities are normally low. As the grind is made coarser, the percent of capacity increase diminishes, but there is still a substantial increase. Thus the maximum advantages gained by the use of my power feed assembly are in the fine grind ranges, specifically, in the 80% to 90% through 28 mesh.

In practice, the use of my power feed assembly can almost double the capacity on the finest grinds. While this improvement diminishes as the grind gets coarser, the improvement is still at from 15% to 20% in the area of the U.S. Standard Drip, Urn or Vendo (vending) grinds. In tests which I have run it is indicated that we can operate at a 10% lower power (amperage) figure, in using the power feed instead of the standard gravity feed of the prior art. In addition to the obvious advantages of greater capacities and efficiencies, the power feeder, as above mentioned, provides greater roll life, and permits automation of feed.

In the FIGURE 4 embodiment material to be treated is transferred by means of an inclined conveyor 52 from a supply hopper 53 to the top opening 5. This arrangement may be particularly advantageous when only limited head room is available, or an existing source of supply is located some distance from the granulizing structure. In this embodiment, as in the FIGURE 1 embodiment, no undesirable head or pressure of beans above the initial pair of granulizer rolls is present. Furthermore, the beans will be uniformly distributed from end to end of the granulizer rolls since the individual pockets in conveyor 52 will be filled from end to end in much the same manner as the pockets 23 are filled in the vaned rotor embodiment of FIGURE 4.

I claim:
1. The method of feeding coffee beans to the top rolls of a coffee granulizer which includes interrupting the flow of beans toward the granulizer, while supporting the head of beans above a zone of interruption, providing a distribution of beans, substantially uniformly along the length of the granulizer inlet, and delivering the interrupted beans, in successive closely spaced charges, downwardly by free gravital fall into the granulizer, while maintaining such charge with a generally uniform distribution of coffee beans throughout a length equivalent to the length of the bite between the top rolls of the granulizer.

2. In combination with at least two-pairs of opposed horizontally axised grinding rolls, a horizontally axised feed rotor positioned thereabove, these axes being parallel, a plurality of longitudinally disposed flutes formed in the feed roll and extending substantially over and in vertical registry with the entire bite of the grinding rolls, a housing above said rotor having an upper opening and a lower opening, said lower opening being directed toward said grinding rolls, means for directing a mass of coffee beans from above through the upper opening and into contact with an upper portion of the rotor, including a yielding flap located within the housing and positioned and adapted to skim the surface of each flute load throughout its entire length as the flutes pass beneath it in the course of the rotation of the feed rotor, and means for rotating the rotor and for thereby positively moving the beans held in the flutes laterally and downwardly in a path terminating in a gravital delivery of the beans through the bottom of the housing and toward the bite between the two rolls, the rotor flutes and the rolls being of generally the same length, whereby the coffee beans are uniformly delivered from end to end of the bite.

References Cited

UNITED STATES PATENTS

| | | | |
|---|---|---|---|
| Re. 10,965 | 10/1888 | Oliver | 83—505 X |
| 362,027 | 4/1887 | Hawhood | 241—225 X |
| 811,574 | 2/1906 | Nikolai | 241—225 X |
| 816,390 | 3/1906 | Simon et al. | 241—225 X |
| 909,429 | 1/1909 | Laxton | 241—111 X |
| 1,359,357 | 11/1920 | Gerwen | 241—225 X |
| 1,365,228 | 1/1921 | Davidson | 241—225 |
| 1,450,723 | 4/1923 | Gillespie | 241—225 X |
| 1,530,615 | 3/1925 | Pohl | 241—111 |
| 1,709,018 | 4/1929 | Howson | 241—111 |
| 2,144,533 | 1/1939 | Hazle | 241—111 X |
| 2,282,708 | 5/1942 | Dantzig | 241—65 X |

FRANK T. YOST, Primary Examiner

U.S. Cl. X.R.

241—112, 159, 225